United States Patent [19]

Furukawa et al.

[11] Patent Number: 4,538,824
[45] Date of Patent: Sep. 3, 1985

[54] STEERING DEVICE FOR VEHICLE

[75] Inventors: Yoshimi Furukawa, Saitama; Shoichi Sano, Tokyo, both of Japan

[73] Assignee: Honda Giken Kogyo Kabushiki Kaisha, Tokyo, Japan

[21] Appl. No.: 544,433

[22] Filed: Oct. 21, 1983

[30] Foreign Application Priority Data

Oct. 22, 1982 [JP] Japan ............................. 57-185493
Oct. 22, 1982 [JP] Japan ............................. 57-185494

[51] Int. Cl.³ ................................................ B62D 7/00
[52] U.S. Cl. ........................................ 280/91; 280/103
[58] Field of Search ............ 280/771, 91, 95 R, 95 A, 280/96, 98, 99, 103; 180/140, 234, 236, 240; 74/39, 40, 42, 43, 50, 89, 89.16, 89.2, 496, 498

[56] References Cited

U.S. PATENT DOCUMENTS 3,097,863  7/1963  Moore .................................... 280/99
4,313,514  2/1982  Furukawa et al. .................... 280/91
4,406,472  9/1983  Furukawa ............................. 280/91

Primary Examiner—David M. Mitchell
Assistant Examiner—Ross Weaver
Attorney, Agent, or Firm—Irving M. Weiner; Pamela S. Burt; Joseph P. Carrier

[57] ABSTRACT

A steering device for a vehicle having front and rear wheels. The device includes a front wheel turning mechanism operatively connected to a steering wheel and turning the front wheels at a steering angle proportional to a steering angle of the steering wheel, and a rear wheel turning mechanism for turning the rear wheels at a turning angle corresponding to a steering angle of the steering wheel. A first transmitting mechanism for moving the rear wheel turning member at a first rate corresponding to an amount of rotation of the input shaft and a second transmitting mechanism for moving the rear wheel turning member at a second rate corresponding to an amount of rotation of the input member, are disposed between the input member rotated in proportion to a steering angle of a steering wheel of the rear wheel turning means and a rear wheel turning member connected to tire-rods for turning the rear wheels.

4 Claims, 9 Drawing Figures

4,538,824

STEERING DEVICE FOR VEHICLE

BACKGROUND OF THE INVENTION

1. Field of the Invention

This invention relates to a steering device for a vehicle for use in turning front wheels together with rear wheels in response to a steering operation of the steering wheel.

2. Description of the Relevant Art

In Japanese patent application Nos. 56-118698 and 57-47743, there is disclosed a steering device for a vehicle which provides a simultaneous turning of the front and rear wheels by a method wherein a rotation required for turning rear wheels is produced as a turning of an oscillating linkage and an eccentric pin, etc., from a front wheel turning system, through a linkage member.

The above-mentioned steering device enables the rear wheels to be turned in the same direction as that of the front wheels under an operation of the steering wheel in a small steering angle and also turned in an opposite direction with a large steering angle operation, with the result that an operating characteristic during high speed travel of the vehicle is improved and manueverability of the vehicle is improved due to the fact that a small radius of curvature can be obtained with a large steering angle when effecting a U-turn operation or when entering or exiting of the vehicle to and from a parking place, etc.

However, turning of the rear wheels in such device is performed through a pivotal movement of the oscillating linkage or eccentric pin etc., such that a turning angle of the rear wheels is dependent upon a relatively simple function.

That is, in the above-mentioned steering device, the turning angle of the rear wheels with respect to the steering angle of the steering wheel is given as a sine function, with the result that one maximum turning angle of the rear wheels when steered in the same direction as that of the front wheels and the other maximum turning angle of the rear wheels when steered in a direction opposite to that of the front wheels, are equal to each other.

Therefore, there has been a tendency that factors such as the most frequently occurring ranges of travel speed during normal use of the vehicle were not taken into consideration when the above-described steering device was applied to various kinds of vehicle.

For example, in a vehicle which is operated in only a low speed range, it seems preferable to have one maximum turning angle of the rear wheels in the same direction as that of the front wheels smaller than the other maximum turning angle of the rear wheels in a direction opposite to that of the front wheels, rather than to have an equal setting of the two maximum turning angles of the rear wheels as described above, so as to provide the aforesaid improvements.

It will be understood that a setting of a characteristic of variation in the turning angle of the rear wheels with respect to a variation of the steering angle of the steering wheel based on use of the vehicle can further dramatically improve operation of a vehicle provided with the above-mentioned conventional vehicle steering device per se.

The present invention provides a further improvement of the above-described conventional type of vehicle steering device.

SUMMARY OF THE INVENTION

The present invention provides a steering device for a vehicle having front and rear wheels comprising means for turning the front wheels operatively connected to a steering wheel so as to turn the front wheels with a turning angle proportional to a steering angle of the steering wheel under an operation of the steering wheel, and means for turning the rear wheels operatively connected to the steering wheel so as to perform a turning of the rear wheels in the same direction as that of the front wheels and an opposite direction thereto and with a turning angle corresponding to a steering angle of the steering wheel under an operation of the steering wheel. The means for turning the rear wheels comprises a tie-rod for turning the rear wheels, a rear wheel turning member connected to the tie-rod so as to turn the rear wheels by its movement, an input member rotated in proportion to a steering angle of the steering wheel, a first transmitting means disposed between the input member and the rear wheel turning member so as to move the rear wheel turning member with at a first rate corresponding to an amount of movement of the input member and a second transmitting means disposed between the input member and the rear wheel turning member so as to move the rear wheel turning member at a second rate corresponding to an amount of rotation of the input member.

Thus, it is an object of the present invention to provide a vehicle steering device capable of turning rear wheels together with front wheels with a steering angle ratio which is appropriate with respect to actual use of the vehicle.

Referring now to the drawings, two preferred embodiments of the present invention will be described in detail. Further features, objects and advantages of the present invention will become more apparent from the following detailed description.

DETAILED DESCRIPTION OF THE PREFERRED EMBODIMENTS

Figure 1:
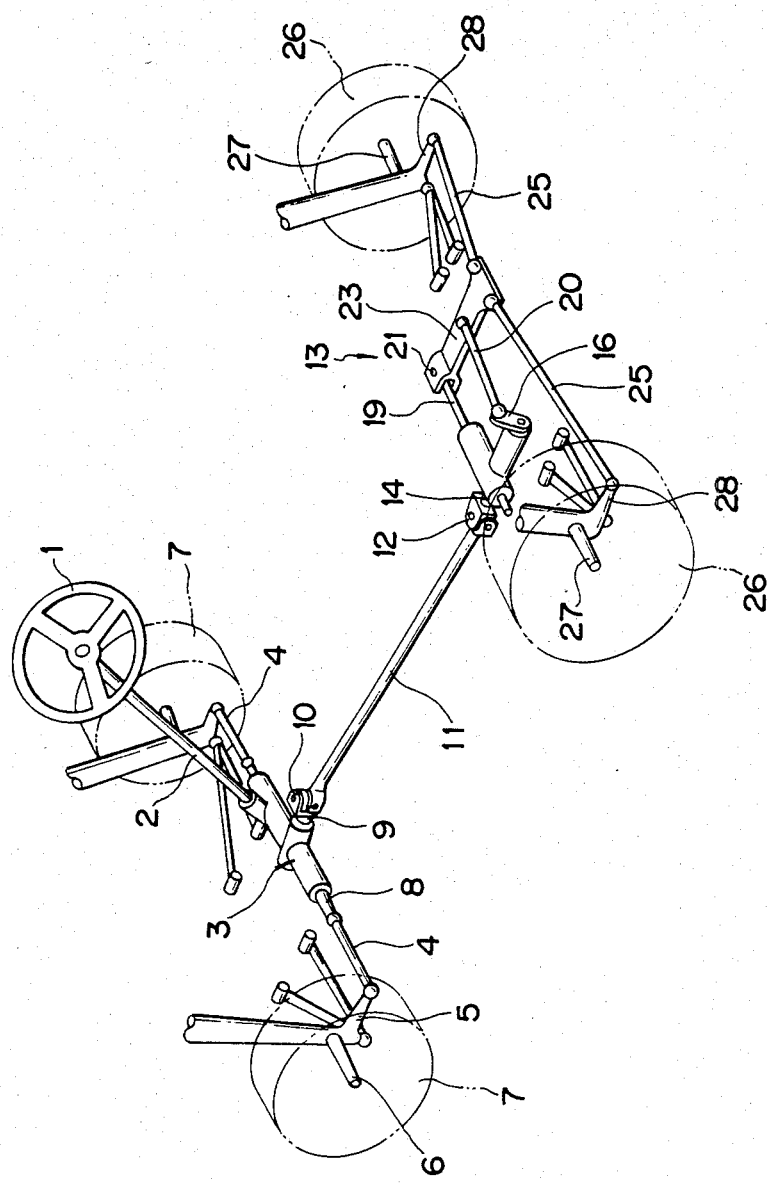
FIG. 1 is a perspective view showing a schematic arrangement of a steering system for four-wheeled vehicle provided with a steering device according to a first preferred embodiment of the present invention.

In FIG. 1, reference numeral 1 indicates a steering wheel. A steering shaft 2, integrally connected to the steering wheel 1 and rotated therewith, is operatively connected to a rack and pinion mechanism 3 fixedly supported on a vehicle body. Each of the tie-rods 4, 4 is moved under a turning operation of the steering wheel 1 in a rightward or leftward direction, resulting in turning of the front wheels 7 through a knuckle arm 5 connected to the end part of the tie-rod 4 and a front wheel shaft 6 coupled to the knuckle arm.

In turn, a rack 8 of the rack and pinion mechanism 3 is engaged with a pinion (not shown) fixed to an end of the steering shaft 2 at its rigt half portion and further engaged with a pinion part (not shown) of a driven shaft 9 extended rearwardly at its left half part. The driven shaft 9 is connected to the front end of a longitudinal link 11 through a universal joint 10, and in turn, a rear end of the link 11 is coupled to an input shaft 14 of a rear wheel turning mechanism 13 through a universal joint 12.

Figure 2:
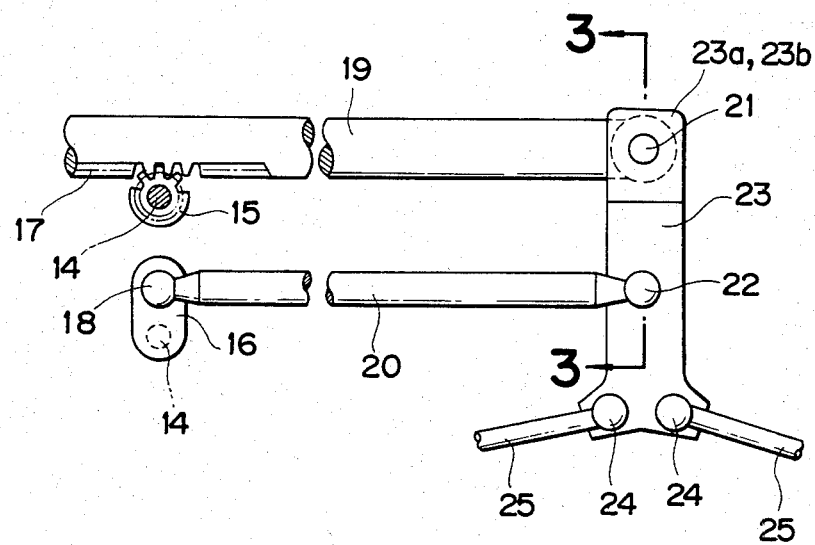
FIG. 2 is an enlarged top plan view showing a substantial part of the steering device shown in FIG. 1.

The input shaft 14 is assembled in a gear box (not shown) for use in turning the rear wheels, which box is fixedly arranged at a left rear side of the vehicle body. Around an outer circumferential portion of the input shaft 14 is fixedly fitted a pinion 15 which is concentric with the input shaft 14 as shown in FIG. 2, and at its rear end is fixed a crank arm 16. The crank arm 16 is fixed to the shaft 14 in such a manner as to permit movement thereof under a rotation of the input shaft 14 in a plane crossing at a right angle with the input shaft 14, and further the crank arm has a crank pin (not shown) extending horizontally and rearwardly relative to the vehicle body at its rear surface.

FIG. 2 is an enlarged top plan view showing a substantial part of the rear wheel turning mechanism shown in FIG. 1, wherein a fitted part and a connected part between the input shaft 14, pinion 15 and crank arm 16 are shown as rotated 90° in a counter-clockwise direction as viewed from a left side of the vehicle shown in FIG. 1.

As shown in FIG. 2, the pinion 15 is engaged with a rack 17 arranged laterally of a vehicle body, and in turn, the crank arm 16 is coupled to a connecting rod 20, which is extended substantially in a lateral direction of the vehicle body and is substantially parallel to the rack shaft 19 of the rack 17, through a ball bearing 18 engaged with the crank pin (not shown) of the arm 16.

Figure 3:
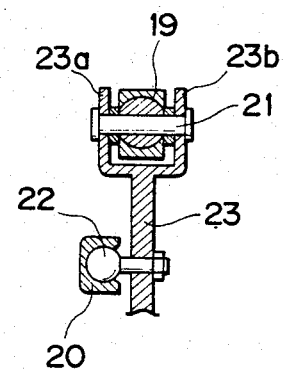
FIG. 3 is a section taken along line 3—3 of FIG. 2.

As shown in FIGS. 2 and 3, each of the right ends of the rack shaft 19 and the connecting rod 20 is pivotally arranged at an oscillating arm member 23 through a pin 21 and a ball bearing 22. The arm member 23, as apparent from FIGS. 1 and 2, comprises a rectangular plate portion. A longitudinal axis of the arm member 23 is arranged longitudinally of a vehicle body when the steering wheel 1 is in its neutral position, and in turn the pin 21 is vertically fixed between the front forked portions 23a and 23b of the arm member 23 and further the ball bearing 22 is attached at a substantial intermediate part in the top surface of the arm member 23. The arm member 23 is supported by a supporting mechanism (not shown) in such a way that it can be moved only in a horizontal plane. Further, as already described, the crank arm 16 is arranged such that it occupies an upright position as shown in FIG. 2 when the steering wheel 1 is in its neutral position or when the steering angle is at a zero value.

In turn, both rear end parts of the arm member 23 are pivotally connected to one end of the tie-rods 25 through ball joints 24, 24 fixed on the end part thereof. The other end of each tie-rod 25 is pivotally connected to a knuckle arm 28 coupled to a shaft 27 of each respective rear wheel 26. Thus, the rear wheels 26 are turned under a movement in a horizontal plane of the horizontal oscillating arm member 23, as shown in FIG. 1.

When the steering wheel 1 is operated, the rack shaft 8 of the rack and pinion mechanism 3 for turning the front wheels rightwardly and leftwardly, and a rotation required for turning the rear wheels is produced at the driven pinion shaft 9 engaged with the left-half side of the rack shaft 8. The rotation is transmitted to the input shaft 14 of the rear wheel turning system through link 11 and then the input shaft 14 is rotated in either a rightward or leftward direction.

A rotation of the input shaft 14 causes the rack shaft 19, engaged with the pinion 15 which is fixed and fitted to a front outer circumferential portion thereof, and the connecting rod 20 coupled to the crank pin (not shown) projected at its rear end through the crank arm 16, to be moved in a substantially linear condition in a lateral direction at relatively different speeds, respectively, and further the connecting rod 20 is reciprocated in response to a rotation of the crank of the crank pin.

Figure 4:
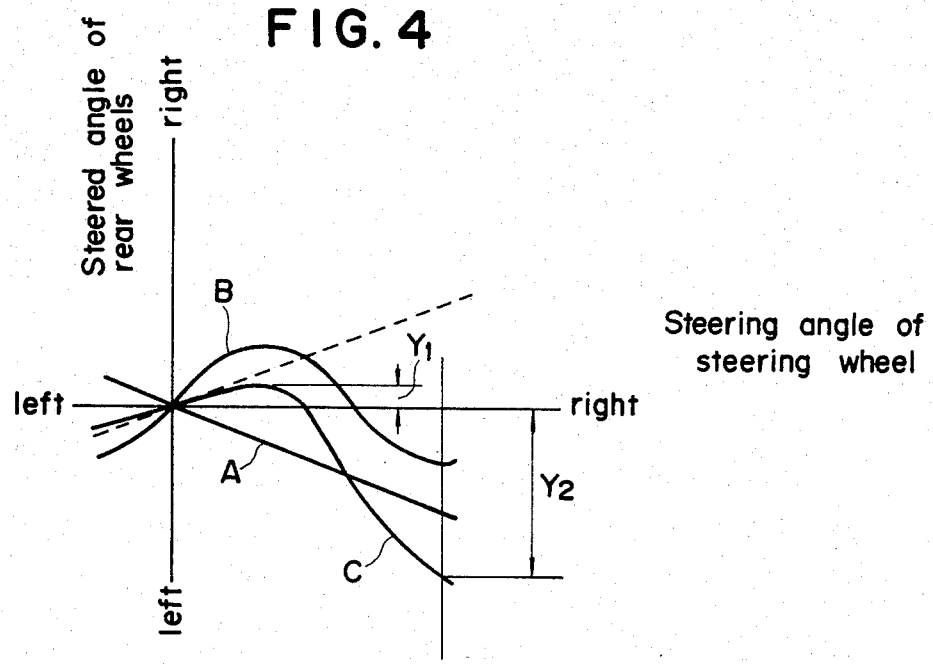
FIG. 4 is a diagram illustrating a relation between a steering angle of a steering wheel and a turning angle of rear wheels in the first preferred embodiment.

A stroke of the rack shaft 19 under an engagement between the pinon 15 and the rack 17 is proportional, and when a rear pivotal point 22 for the rod 20 is assumed as a non-movable point, the arm member 23 pivotally supported at the right end of the rack shaft 19 is oscillated horizontally in such a way that the rear wheels 26, 26 are turned in a linear form as shown at a straight line A in FIG. 4, through the rightward and leftward movement of the right and left tie-rods 25, 25 connected and supported at the rear end of the arm member 23.

In turn, the arm member 23 pivotally fixed at the right end of the connecting rod 20, having a left end pivotally supported at the crank pin (not shown), is oscillated horizontally in such a way that the rear wheels are turned as shown at a sine-like curved line B in FIG. 4 under a movement of the rod 20 when the pivotal point 21 defined by the rack shaft 19 is assumed to be a non-movable point.

Positive and negative values in X-axis on the graph of FIG. 4 indicate the input values of right and left steering of the steering wheel 1, respectively, and the positive and negative values on the Y-axis indicate the values of right and left steered angles of the rear wheels, respectively.

As apparent from the description hereinbelow, dimensions of the pinion 15 and the rack 17 in the first preferred embodiment of the sizes of the crank arm 16 and the connecting rod 20 are set such that the amount of movement of the pivotal points 21 and 22 in a lateral direction of the vehicle body is substantially equal in value when the input shaft 14 is rotated by 90° in a clockwise direction (or counter-clockwise direction).

Figure 5:
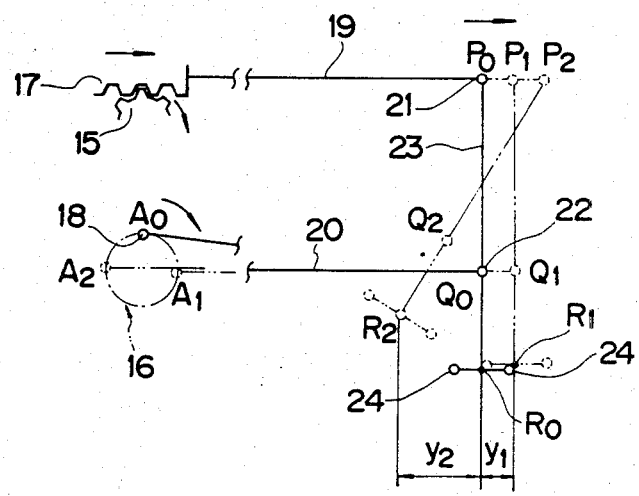
FIG. 5 is a view illustrating a movement of the substantial parts of the steering device shown in FIG. 2.

Referring now to FIGS. 2, 4 and 5, a turning operation of the rear wheels 26 with the rear wheel turning mechanism 13 shown in FIGS. 1 to 3 will be described in detail.

FIG. 5 shows schematically the members 15, and 17 to 24 illustrated in FIG. 2, wherein a movement of these members is illustrated when the steering wheel 1 is steered.

With the arrangement shown in FIGS. 2 or 5, as apparent from the above description, if the pinion 15 and the crank arm 16 are turned under a steering operation of the steering wheel 1 and the pinion and the arm 16 are turned in a clockwise direction in FIG. 5, the rack shaft 19 is moved rightwardly to the vehicle body in proportion to an amount of rotation of the pinion 15, and in turn, as viewed from above the vehicle body, the connecting rod 20 performs a substantially linear movement in the same direction as that of the rack shaft 19 while its speed is gradually decreased from the neutral position of the crank arm 16 to 90° rotation, and is gradually increased from 90° rotation of the crank arm 16 to 180° rotation, and similarly performs a linear movement while the speed is gradually decreased from 180° rotation to 270° rotation in an opposite direction. As a result, the arm member 23 is oscillated in response to the movements of the rack shaft 19 and the rod 20 and thus the rear wheels 26 are turned according to a combination of the lines A and B in FIG. 4, i.e., curved line C.

In FIG. 5, $A_0$, $A_1$ and $A_2$ represent a position of the crank pin (not shown) or ball joint 18 when an amount of clockwise rotation of the crank arm 16 is 0°, 90° and 270°, respectively, and $P_0$ to $P_2$, $Q_0$ to $Q_2$ and $R_0$ to $R_2$ represent a pivotal point 21, pivotal point 22 and a central point between the ball joints 24 and 24, respectively. In FIG. 5, $y_1$ represents a maximum amount of movement of the point R when the rear wheels 26 are turned in the same direction as that of the front wheels 7, and $y_2$ represents a maximum amount of movement of the point R in a lateral left direction of the vehicle body. As shown in FIG. 4, maximum amounts of turning $Y_1$ and $Y_2$ in the same direction as that of and opposite direction to that of the front wheels are produced in response to $y_1$ and $y_2$.

As shown by the curved line C in FIG. 4, up to 90° rotation of the input shaft 14, the rear wheels 26 are turned in the same direction as that of the front wheels 7 with a positive gradient, and in turn when over 90° rotation, the gradient shows a negative value, the rear wheels 26 are returned at once to their neutral position between 90° rotation and 180° rotation, and then the rear wheels 26 are turned in an opposite direction to that of the front wheels 7 up to 270° rotation. When the input shaft 14 is rotated to 270°, there is provided a maximum amount of turning movement $y_2$ of the rear wheels in a direction opposite to that of the front wheels.

With the foregoing, as apparent from FIG. 5, $y_2 > y_1$ and $y_2 : y_1 = y_2 : y_1$ can be obtained.

Thus, the steering device of the first preferred embodiment of the present invention can provide a turning of the rear wheels, as shown by the curved line C in FIG. 4, which is simultaneous with the turning of the front wheels under an operation of the steering wheel. The steering device arranged such that the rear wheels are turned in response to the rear wheel turning curve, is preferably applied to a vehicle which is normally operated in a low speed range as already described, resulting in that a manueverability of the vehicle is improved. That is, the first preferred embodiment of the invention is mainly applied on the basis of handling of the vehicle at low speed travel.

Figure 6:
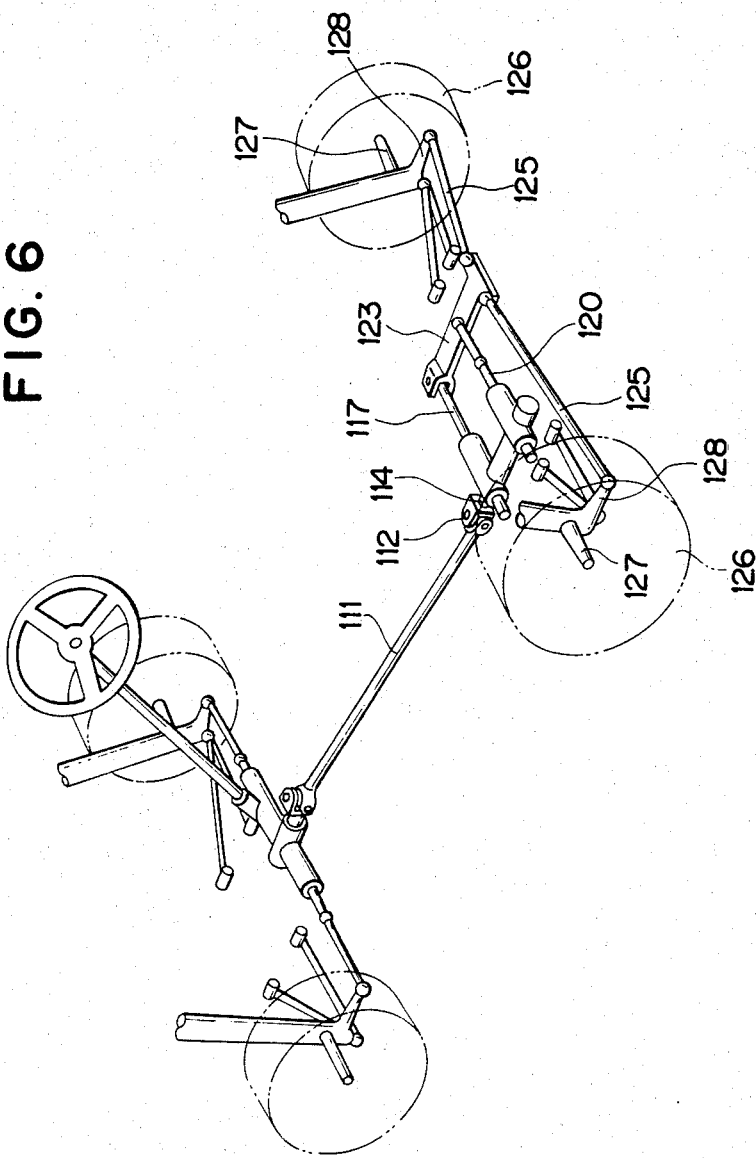
FIG. 6 is a perspective view illustrating a schematic arrangement of a steering system for a four-wheeled vehicle provided with a steering device constructed according to a second preferred embodiment of the present invention.

FIG. 6 shows a vehicle steering device according to the second preferred embodiment of the present invention, wherein the operation of the device before the link 111 is turned is performed similarly with the same arrangement as that of the first preferred embodiment and thus a description of the front wheel turning mechanism will be omitted.

As shown in FIG. 6, in the second preferred embodiment, two types of rack 117 and 120 are employed, in place of the linear rack and the rotary crank arm of the first preferred embodiment, as the members to be engaged with the input shaft 114 connected through the universal joint 112 to the link 111 rotated under an operation of the rear wheels. Thus, the racks 119 and 120 are moved under a rotation of the input shaft 114 when the steering wheel is operated, thereby an arm member 123 pivotally connected at the right ends of both racks and moved in a horizontal plane drives the knuckle arm 128 through the tie-rod 125, and thus the rear wheels 126 are turned through the wheel shaft 127.

Figure 7:
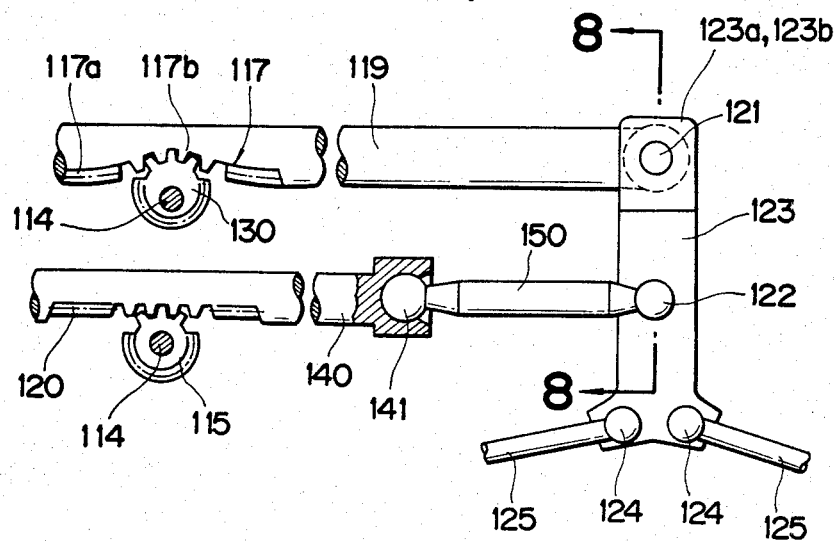
FIG. 7 is an enlarged view showing a substantial part of the steering device shown in FIG. 6.

FIG. 7 shows, similarly to FIG. 2, a rear wheel turning mechanism between the input shaft 114 and the tie-rods 125.

Figure 8:
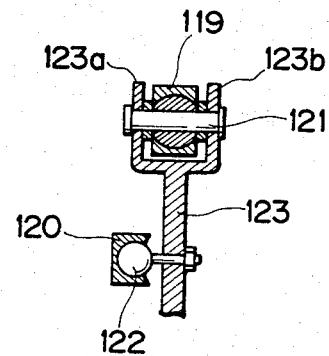
FIG. 8 is a section taken along line 8—8 of FIG. 7.

Pivotable attachment of the two racks to the arm member 123 is effected as shown in FIG. 8 through the pin 121 vertically fixed between the forked portions 123a and 123b of the arm member, and a ball joint 122 fixed substantially at an intermediate point of the arm member 123. In turn, both rear ends of the arm member 123 are pivotally connected to one end of the right and left tie-rods 125, 125, respectively, through the ball joints 124 fixed at the end part. The arm member 123 is supported by a supporting mechanism (not shown) in such a way as it can be moved only in a horizontal plane.

As shown in FIG. 7, at the outer circumference of the input shaft 114 are fixedly fitted a rear normal pinion 115 and a front eccentric pinion 130 axially spaced apart thereon.

Thus, the racks 120, 117 are engaged with both pinions 115 and 130 in such a way as they can be crossed at a right angle with the input shaft.

The rack 117 engaged with the front eccentric pinion 130 is formed with corrugated continuous teeth having a top part 117a and bottom part 117b, and the rack shaft 119 is pivotally connected to the arm member 123 at the right end through a pin 121 as described above. As already apparent, FIG. 7 shows a condition around the input shaft when a steering shaft is in its neutral position, wherein the eccentric pinion 130 is fitted to the input shaft 114 in such a way as it can be engaged with the bottom part 117b of the rack 117 as shown, that is, the pinion 130 is set at its highest position, and a distance between a center of the input shaft 114 and a center of the pinion 130, that is, an eccentric distance of the pinion 130 is set to a half of a difference in height between the top part 117a and the bottom part 117b.

In turn, the rack 120 engaged with the normal rear pinion 115 has normal rack teeth, the right end of the rack shaft 140 is pivotally connected to the rod 150 through a ball joint 141 and the right end of the rod 150 is pivotally coupled to a substantially intermediate part on the upper surface of the arm member 123 through the above-described ball joint 122. Arrangement of the rod 150 provides a smooth horizontal oscillation of the arm member 123.

Thus, when the steering wheel is operated, the input shaft 114 for the rear wheel steering system is rotated in either one of the rightward and leftward directions through a link 111 similar to the first preferred embodiment.

The front and rear rack shafts 119 and 140 engaging with each of the front and rear two pinions 130 and 115 fixed to the outer circumferential portion of the input shaft 114 perform a substantially linear movement in either a rightward or leftward direction at relatively different speeds under a rotation of the input shaft 114. In this case, for example, when the input shaft 114 in FIG. 7 is rotated in a clockwise direction, the rack shaft 119 of the rack 117 engaging with the eccentric pinion 130 is moved by a rotation of the pinion 130 in a rightward direction as viewed in the figure, i.e. a lateral direction to the vehicle body, while changing a ratio of movement of the rack shaft with respect to the amount of rotation of the pinion 130.

That is, when the eccentric pinion 130 and the rack 117 are set and arranged as shown in FIG. 7, a diameter of the pitch circle of the pinion 130, having a center which the axial center of the input shaft 114, is gradually decreased down to 180° rotation in case of a clockwise rotation of the input shaft 114 as viewed in the figure, so that an incremental rightward movement of the rack shaft 119 is also gradually decreased during a rotation of the pinion 130 in a range of 0° to 180°.

Figure 9:
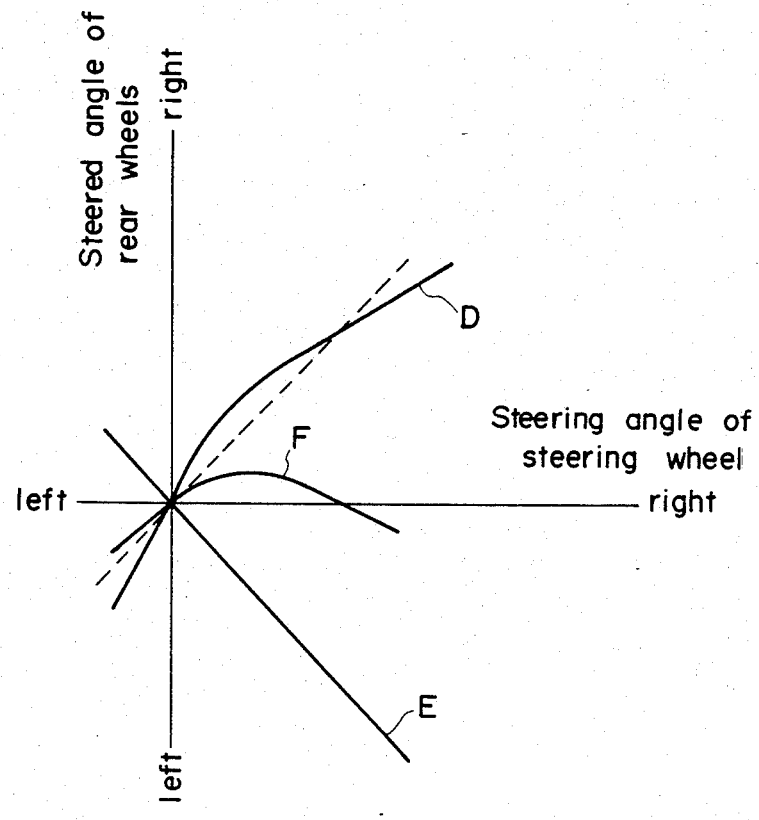
FIG. 9 is a diagram illustrating a relation between a steering angle of a steering wheel and a turning angle of rear wheels in the second preferred embodiment.

Thus, when a rear pivotal point 122 of the arm member 123 pivoted at the right end of the rack shaft 119 is assumed as a non-movable point, the arm 123 is oscillated rightwardly or leftwardly in a horizontal plane under a movement of the rack shaft 119 in such a way that the rear wheels 126, 126 are turned with a variable turning angle ratio as indicated by the curve D in FIG. 9 through a rightward and leftward movement of the right and left tie-rods 125, 125 connected and supported at the rear end of the arm member 123.

In turn, a stroke of the rear rack shaft 130 under an engagement between the rear normal pinion 115 and the rack 120 is proportional to the amount of rotation of the shaft 114, and the arm member 123 pivotally connected to the right end of the connecting rod 150 is oscillated horizontally so as to cause the rear wheels to be turned in a linear form as indicated by a straight line E in FIG. 9 when the front pivotal pin 121 is assumed as a non-movable point.

Positive and negative values on the X-axis in the graph of FIG. 9 represent input amounts of right and left steering operation of the steering wheel, respectively, and positive and negative values on the Y-axis represent the right and left steered amounts of the rear wheels 126, respectively.

With the foregoing arrangement, in the second preferred embodiment of the present invention, a practical rear wheel turning curve is provided as a combined curve F of the curved line D and the straight line E.

In FIG. 9, it is apparent that only an initial stage of operation of the steering wheel is indicated.

According to the steering device of the second preferred embodiment of the present invention, since the rear wheels are turned as shown by the curved line F in FIG. 9, that is since the rear wheels are turned in the same direction as that of the front wheels only in an initial stage of the steering operation of the steering wheel, it is preferable for the vehicle to have a normal low speed operation.

Although in the foregoing preferred embodiments, there have been arranged between the input shaft for turning the rear wheels and a horizontal oscillating arm member for driving tie-rods for turning the rear wheels, a normal pinion having a function of linear transmittance, a crank arm having a function of non-linear transmittance or an eccentric pinion having a function of non-linear transmittance and a normal pinion having a function of linear transmittance, and two members having both functions of non-linear transmittance may be arranged in place of the above. Further, it is possible to provide a reversed arrangement of the crank arm and the normal pinion in FIG. 2 so as to make a desired rear wheel turning curve, although it is required to have a crank formed input shaft in this case.

A mechanism for transmitting a steering rotation to the input shaft may also be of any suitable type and, for example, a chain and, belt may be applied in place of the longitudinal link.

What is claimed is:

1. A steering device for a vehicle having front and rear wheels, comprising:
    means for turning said front wheels, operatively connected to a steering wheel so as to turn said front wheels at a turning angle proportional to a steering angle of said steering wheel under an operation of said steering wheel;
    means for turning said rear wheels, operatively connected to said steering wheel so as to perform a turning of said rear wheels in the same direction as that of said front wheels and in an opposite direction thereto, and with a turning angle corresponding to a steering angle of said steering wheel under an operation of said steering wheel; and
    said means for turning said rear wheels comprising:
    tie-rods for turning said rear wheels;
    a rear wheel turning member connected to said tie-rods so as to turn said rear wheels by movement thereof;
    an input member adapted to be rotated in proportion to a steering angle of said steering wheel;
    a first transmitting means disposed between said input member and said rear wheel turning member so as to move said rear wheel turning member at a first rate corresponding to an amount of movement of said input member; and
    a second transmitting means disposed between said input member and said rear wheel turning member so as to move said rear wheel turning member at a second rate corresponding to an amount of rotation of said input member.

2. A steering device according to claim 1, wherein said input member comprises a longitudinal link arranged longitudinally of the vehicle body and rotated in proportion to a steering angle of said steering wheel, and an input shaft connected to a rear end of said link through a universal joint in such a way as it may be substantially axially coincided with said link, and
    said rear wheel turning member comprises a substantially rectangular plate member arranged substantially in a horizontal plane so as to be movable in said horizontal plane including said input shaft, the longitudinal axis thereof being substantially parallel to said input shaft and arranged in a vertical plane containing a longitudinal center axis of said vehicle.

3. A steering device according to claim 2, wherein said first transmitting means comprises a normal pinion fitted on said input shaft and a rack shaft arranged in a lateral direction of the vehicle body so as to be engaged with said pinion and having one end pivotally connected to a front central part of said plate member;
    said second transmitting means comprises a crank arm fixed to said input shaft, and a rod arranged in a substantially lateral direction of the vehicle body having one end pivotally connected to said crank arm and the other end pivotally connected to a substantially central part of each said plate member and an end part of said tie-rod is pivotally connected to a rear part of said plate member.

4. A steering device according to claim 2, wherein said first transmitting means comprises a pinion eccentrically fitted on said input shaft, and a rack shaft arranged in the transverse direction of the vehicle body so as to be engaged with said pinion and having one end pivotally connected to a front central part of said plate member, said second transmitting means comprises a pinion fitted on said input shaft and a rack shaft arranged to extend in a lateral direction of the vehicle body so so to be engaged with said pinion and having one end pivotally connected to the other end of a rod, one end of which is pivotally connected at a substantially central point of said plate member, and an end part of each said tie-rod is pivotally connected to a rear part of said plate member.

* * * * *